(12) United States Patent
Colclough

(10) Patent No.: US 7,681,832 B2
(45) Date of Patent: Mar. 23, 2010

(54) DUCTED FAN AIR VEHICLE WITH DEPLOYABLE WINGS

(75) Inventor: John C. Colclough, Albuquerque, NM (US)

(73) Assignee: Honeywell International inc., Morristown, NJ (US)

( * ) Notice: Subject to any disclaimer, the term of this patent is extended or adjusted under 35 U.S.C. 154(b) by 0 days.

(21) Appl. No.: 11/947,585

(22) Filed: Nov. 29, 2007

(65) Prior Publication Data

US 2008/0272226 A1  Nov. 6, 2008

Related U.S. Application Data

(60) Provisional application No. 60/915,542, filed on May 2, 2007.

(51) Int. Cl.
*B64C 15/00* (2006.01)
(52) U.S. Cl. .................. 244/12.2; 244/23 A; 244/2; 244/49; 244/7 R
(58) Field of Classification Search ............... 244/7 R, 244/12.2, 23 B, 23 C, 23 A, 2, 203, 49; 701/8
See application file for complete search history.

(56) References Cited

U.S. PATENT DOCUMENTS

| | | | |
|---|---|---|---|
| 3,606,208 A * | 9/1971 | Postelson-Apostolescu . | 244/7 R |
| 4,664,340 A | 5/1987 | Jackson | |
| 5,150,857 A | 9/1992 | Moffitt et al. | |
| 5,152,478 A | 10/1992 | Cycon et al. | |
| 5,295,643 A | 3/1994 | Ebbert et al. | |
| 5,575,438 A | 11/1996 | McGonigle et al. | |
| 5,695,153 A | 12/1997 | Britton et al. | |
| 6,073,882 A | 6/2000 | Zieger | 244/48 |
| 6,422,508 B1 | 7/2002 | Barnes | |
| 6,450,445 B1 | 9/2002 | Moller | |
| 6,502,787 B1 | 1/2003 | Barrett | |
| 6,575,402 B1 | 6/2003 | Scott | |
| 6,588,701 B2 | 7/2003 | Yavnai | |
| 6,604,706 B1 | 8/2003 | Bostan | |
| 6,622,090 B2 | 9/2003 | Lin | |
| 6,665,594 B1 | 12/2003 | Armstrong | |
| 6,691,949 B2 | 2/2004 | Plump et al. | |
| 6,694,228 B2 | 2/2004 | Rios | |
| 6,712,312 B1 | 3/2004 | Kucik | |
| 6,721,646 B2 | 4/2004 | Carroll | |

(Continued)

FOREIGN PATENT DOCUMENTS

EP 1868008 12/2007

(Continued)

*Primary Examiner*—J. Woodrow Eldred
(74) *Attorney, Agent, or Firm*—Shumaker & Sieffert, P.A.

(57) ABSTRACT

A ducted fan air vehicle and method of operation is disclosed for obtaining aerodynamic lift and efficiency in forward flight operation without significantly impacting hover stability. One or more retractable wings are included on the ducted fan air vehicle and are deployed during forward flight to provide aerodynamic lift. The wing or wings are retracted when the vehicle hovers to reduce the impact the wings have on stability in a wind. Each wing may conform to the curvature or profile of the vehicle when retracted, and may be constructed in one or more wing sections. The wing or wings may be deployed and retracted automatically or at the command of an operator. Each wing and related components may be integrated into the vehicle or may be detachable.

14 Claims, 6 Drawing Sheets

U.S. PATENT DOCUMENTS

| | | | |
|---|---|---|---|
| 6,813,559 | B1 | 11/2004 | Bodin et al. |
| 6,847,865 | B2 | 1/2005 | Carroll |
| 6,873,886 | B1 | 3/2005 | Mullen et al. |
| 6,883,748 | B2 * | 4/2005 | Yoeli .................. 244/12.3 |
| 7,000,883 | B2 | 2/2006 | Mercadal et al. |
| 7,032,861 | B2 | 4/2006 | Sanders, Jr. et al. |
| 7,044,422 | B2 | 5/2006 | Bostan |
| 7,158,877 | B2 | 1/2007 | Carlsson et al. |
| 7,228,227 | B2 | 6/2007 | Speer |
| 7,231,294 | B2 | 6/2007 | Bodin et al. |
| 7,249,732 | B2 * | 7/2007 | Sanders et al. ............ 244/23 A |
| 7,289,906 | B2 | 10/2007 | Van Der Merwe et al. |
| 7,299,130 | B2 | 11/2007 | Mulligan et al. |
| 7,302,316 | B2 | 11/2007 | Beard et al. |
| 2004/0094662 | A1 | 5/2004 | Sanders, Jr. et al. |
| 2004/0129828 | A1 | 7/2004 | Bostan |
| 2005/0082421 | A1 | 4/2005 | Perlo et al. |
| 2005/0165517 | A1 | 7/2005 | Reich |
| 2006/0049304 | A1 | 3/2006 | Sanders, Jr. et al. |
| 2006/0102780 | A1 | 5/2006 | Parks |
| 2006/0106506 | A1 | 5/2006 | Nichols et al. |
| 2006/0192047 | A1 | 8/2006 | Goossen |
| 2006/0231675 | A1 | 10/2006 | Bostan |
| 2006/0287824 | A1 | 12/2006 | Lin |
| 2007/0018052 | A1 | 1/2007 | Eriksson |
| 2007/0034738 | A1 | 2/2007 | Sanders, Jr. et al. |
| 2007/0051848 | A1 | 3/2007 | Mantych et al. |
| 2007/0069083 | A1 | 3/2007 | Shams et al. |
| 2007/0129855 | A1 | 6/2007 | Coulmeau |
| 2007/0193650 | A1 | 8/2007 | Annati |
| 2007/0200027 | A1 | 8/2007 | Johnson |
| 2007/0221790 | A1 | 9/2007 | Goossen |
| 2007/0228214 | A1 | 10/2007 | Horak |
| 2007/0244608 | A1 | 10/2007 | Rath et al. |
| 2007/0262195 | A1 | 11/2007 | Bulaga et al. |
| 2007/0271032 | A1 | 11/2007 | Cheng et al. |
| 2007/0295298 | A1 | 12/2007 | Mark |
| 2008/0023587 | A1 | 1/2008 | Head et al. |
| 2008/0035786 | A1 | 2/2008 | Bilyk et al. |
| 2008/0059068 | A1 | 3/2008 | Strelow et al. |
| 2008/0071431 | A1 | 3/2008 | Dockter et al. |
| 2008/0078865 | A1 | 4/2008 | Burne |

FOREIGN PATENT DOCUMENTS

| | | |
|---|---|---|
| EP | 1767453 | 6/2008 |
| WO | 0015497 | 3/2000 |
| WO | 2004002821 | 1/2004 |
| WO | 2007058643 | 5/2007 |

* cited by examiner

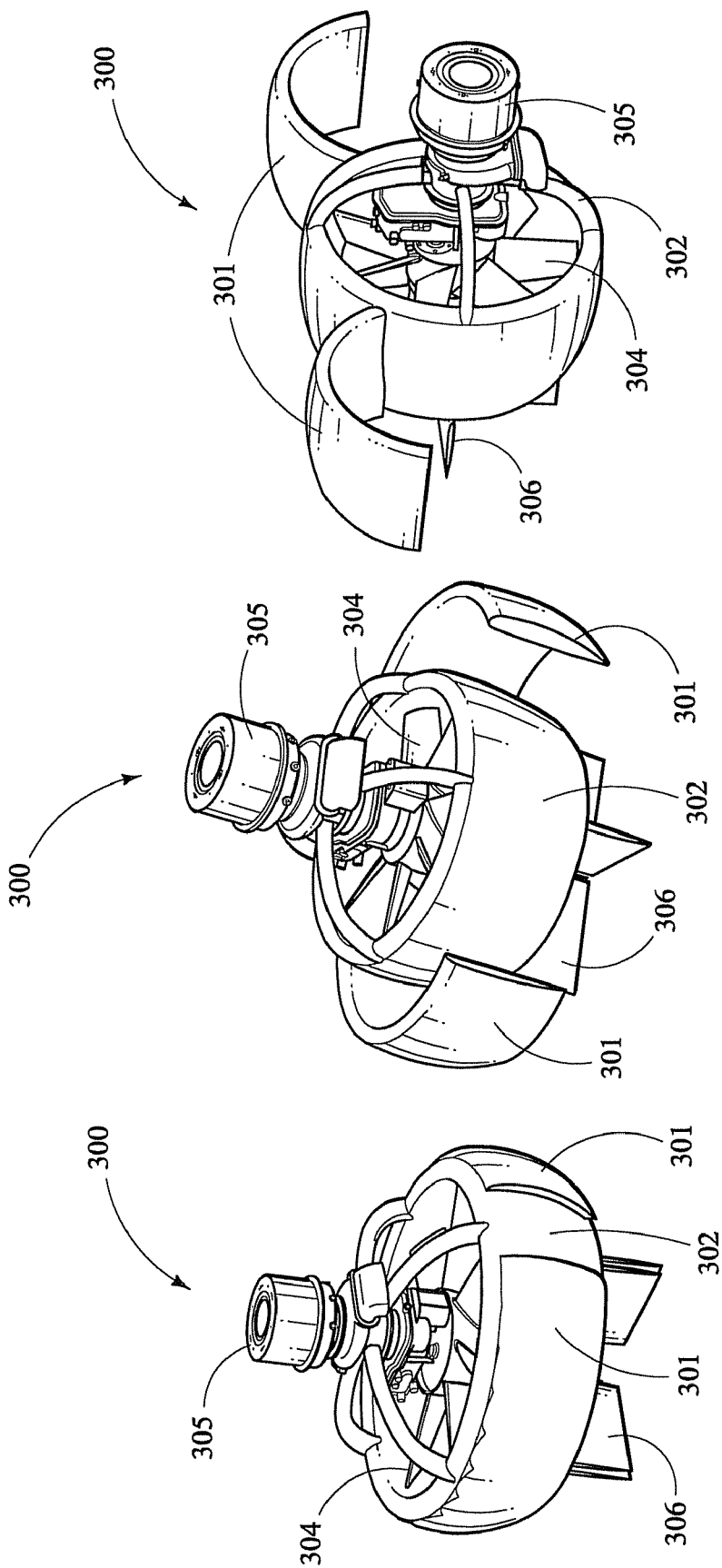

DUCTED FAN AIR VEHICLE WITH DEPLOYABLE WINGS

CROSS-REFERENCE TO RELATED APPLICATIONS

The present patent application claims priority under 35 U.S.C. § 119(e) to U.S. Provisional Patent Application Ser. No. 60/915,542, filed on May 2, 2007, the entirety of which is herein incorporated by reference.

FIELD OF INVENTION

The present application relates to ducted fan air vehicles, and more particularly, to a deployable wing system for such vehicles.

BACKGROUND

A conventional ducted fan vehicle contains one or more motor-driven impellers to generate propulsive force and a means of directing that propulsive force, such as one or more vanes. By controlling the magnitude and direction of the propulsive force, ducted fan vehicles are capable of performing a wide variety of flight maneuvers, including forward flight and hovering. However, ducted fan vehicles have very limited aerodynamic lift in forward flight. The propulsive force provides most of the lift and also provides the thrust to propel the ducted fan vehicle forward. Reliance on the propulsive force to provide both lift and forward thrust limits the range and endurance of the vehicle, and tends to make the vehicle inefficient in forward flight.

SUMMARY

The present application is directed to ducted fan air vehicles and a means of improving forward-light efficiency without disrupting stability while in a hover. One or more retractable wings are deployed to provide aerodynamic lift in forward flight. Either automatically or in response to a command from an operator, the wing or wings can be retracted to return the ducted fan vehicle to an aerodynamic profile that is more stable in a hover. In one embodiment, a servo motor assists in the deployment and retraction of the wings. In another embodiment, the wings are comprised of more than one piece such that the wings follow the contour of the vehicle while in the stowed position. In yet another embodiment, the wings are detachable from the vehicle.

BRIEF DESCRIPTION OF FIGURES

FIG. 5 shows a sequence of perspective views of the ducted fan air vehicle transitioning from the hover operation to the forward flight operation.

DETAILED DESCRIPTION OF EXEMPLARY EMBODIMENTS

Many traditional aircraft utilize a fixed lifting surface to provide lift in forward flight. However, when a ducted fan vehicle hovers, the aerodynamic profile of the vehicle has a significant impact on the stability of the vehicle, especially when a wind is present. Thus while attaching a fixed lifting surface to the ducted fan vehicle may improve efficiency in forward flight, a fixed lifting surface typically has a detrimental affect on the hover stability of the vehicle in a wind.

Figure 1:
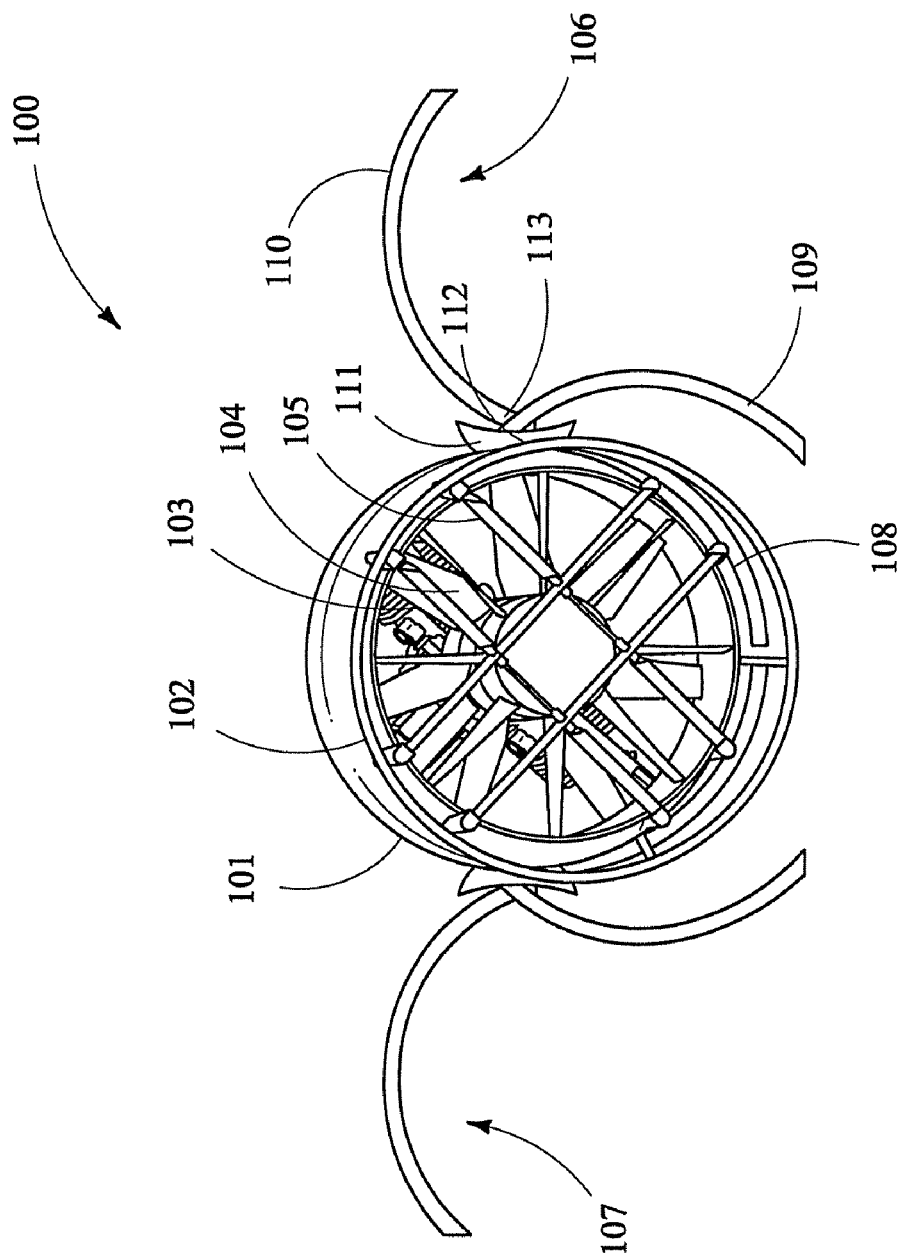
FIG. 1 shows a perspective view of a ducted fan air vehicle in accordance with a first embodiment.

FIG. 1 shows a perspective view of a ducted fan air vehicle 100 in accordance with a first embodiment. The air vehicle 100 includes a body portion 101 comprising a frame 102 to which a motor 103 is attached. The motor 103 drives an impeller 104 to provide propulsion for the air vehicle 100. A plurality of vanes 105 can be used in cooperation with the impelled air to provide steering capabilities for the body portion 101, such as by remote control or by a preprogrammed flight plan. The motor 103 may be powered by electrical energy, a gas-fueled engine or other appropriate means of generating mechanical energy. Control of the motor 103 may be exercised remotely or via pre-programmed instructions.

The air vehicle 100 also includes one or more retractable wings 106, 107. In the embodiment illustrated in FIG. 1, two wings 106, 107 are shown. For simplicity, only one of these wings will be described. The wing 106 is shown at three separate times. The wing 106 at a first time instant 108 is shown in a stowed or retracted configuration. At a second time instant 109, the wing 106 is shown at an intermediate semi-deployed position, between a stowed, retracted configuration and a deployed configuration. Finally, at a third time instant 110, the wing 106 is shown in a fully deployed position. The wing 106 will typically be in either a stowed configuration or a fully deployed configuration. When in a retracted position, the wings 106, 107 may be positioned adjacent to the perimeter of the body 101. However, other retracted positions may provide the desired aerodynamic properties in light of the overall design of the vehicle 100, the body shape 101, and/or the shape of the wings 106, 107.

One or more stopping means, such as a mechanical stop 111 can be included in or on the body portion 101, or as part of the base of the wings 106, 107, to hold the wings 106, 107 open at a desired position, such as a predetermined angle relative to the body portion 101. When the wings 106, 107 are deployed, the wings, 106, 107 can be held against the mechanical stop 111 by the aerodynamic forces experienced by the wings 106, 107.

In addition, one or more retraction servos 112 may be included to retract the wings 106, 107 and/or to deploy the wings 106, 107. The retraction servos 112 may be any type of servo mechanism, or a device used to provide control of the position of the wings 106, 107. Generally, an electric servo motor is used to create mechanical force to move the wings 106, 107. However, other types of servos may be used as well, including, but not restricted to, mechanisms using hydraulic, pneumatic, or magnetic principles.

Deployment of the wings 106, 107 is preferably only initiated by the servo 112, with the resultant air load providing force to fully open the wings. The servo 112 should be able to supply enough force to stow the wing(s) 106, 107 when the air vehicle 100 is in a hover. This force will be relatively low in a hover, since the wings 106, 107 will not be providing any significant lift to the air vehicle 100 during that time period.

The wings 106, 107 are attached to the body 101 through a hinge or other mechanical pivoting mechanism 113 to allow the wings to rotate outward from the body 101 of the air vehicle 100. For example, a first end of the wing 106 would be attached to a hinge 113 on the body 101, so that a second end of the wing can be extended outward and away from the body 101.

Figure 2:
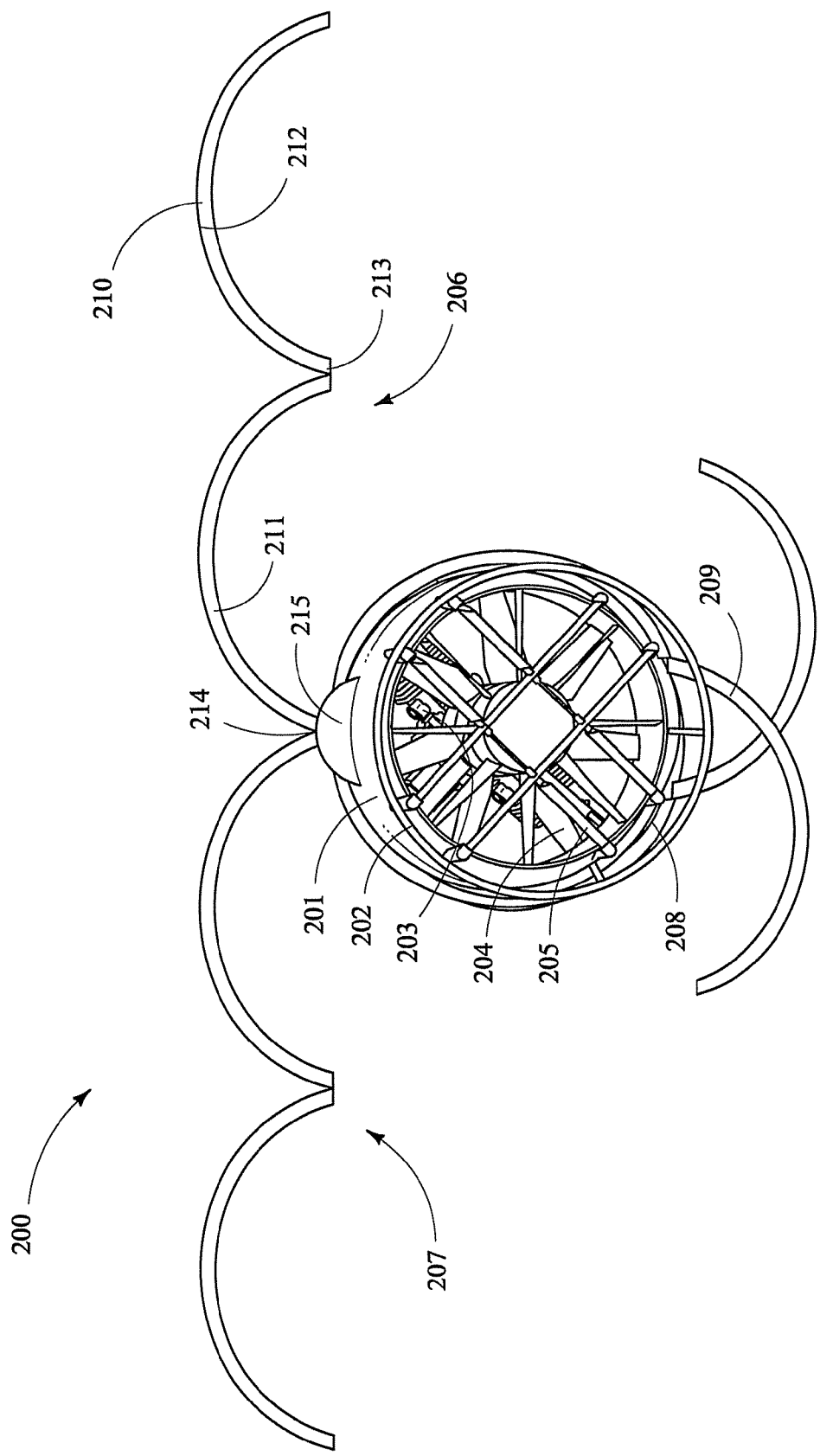
FIG. 2 shows a perspective view of a ducted fan air vehicle in accordance with a second embodiment.

FIG. 2 shows a perspective view of a ducted fan air vehicle 200 in accordance with a second embodiment. The air vehicle 200 includes a body portion 201 comprising a frame 202 to which a motor 203 is attached. Propulsion for the air vehicle 200 is provided by an impeller 204 which is driven by the motor 203. In conjunction with the impelled air, a plurality of vanes 205 can be used to provide steering capabilities for the body portion 201. Steering and other movements can be controlled remotely, or by a preprogrammed flight plan. The motor 203 may be powered by electrical energy, a gas-fueled engine or other appropriate means of generating mechanical energy. Remote control or preprogrammed instructions can be used to control the motor 203.

The air vehicle 200 also includes one or more retractable wings 206, 207. In the embodiment illustrated in FIG. 2, two wings 206, 207 are shown. For simplicity, only one of these wings will be described. The wing 206 is shown at three separate time instants. At a first time instant 208, the wing 206 is shown in a stowed or retracted configuration. At a second time instant 209, the wing 206 is shown at a semi-deployed position, between a stowed, retracted configuration and a deployed configuration. At a third time instant 210, the wing 206 is shown in a fully deployed position. Typically, the wing 206 will be in either a retracted configuration or a fully deployed configuration. When in a retracted position, the wings 206, 207 may be positioned adjacent to the perimeter of the body 101. However, other retracted positions may provide the desired aerodynamic properties in light of the overall design of the vehicle 100, the body shape 101, and/or the shape of the wings 206, 207.

Retractable wings 206, 207 for the air vehicle 200 differ from those of the air vehicle 100, in that each wing 206, 207 comprises two portions 211, 212 (e.g. portions having a radius of curvature approximating that of the body 202). This allows the deployed wings to have a greater surface area to provide improved lift, while maintaining similar hover characteristics while the wings are retracted to those of the air vehicle 100.

Retractable wings 206, 207 are hinged, or otherwise movably connected, to one another. As shown in FIG. 2, a hinge 213 can be included between the two portions 210, 211. While in forward flight, the aerodynamic load experienced by the wing portions 210, 211 can hold the wing portions 210, 211 in a deployed position. If the wings 206, 207 are sufficiently long such that they overlap while in a retracted position, the wings 206, 207 can be retracted and deployed sequentially.

A mechanical stop 214 and retraction servo 215 can also be included in the air vehicle 200 to deploy the wings 206, 207, maintain the position of the wings 206, 207 with respect to the vehicle body 201, and retract the wings 206, 207 described with respect to the air vehicle 100 in FIG. 1.

Figure 3:
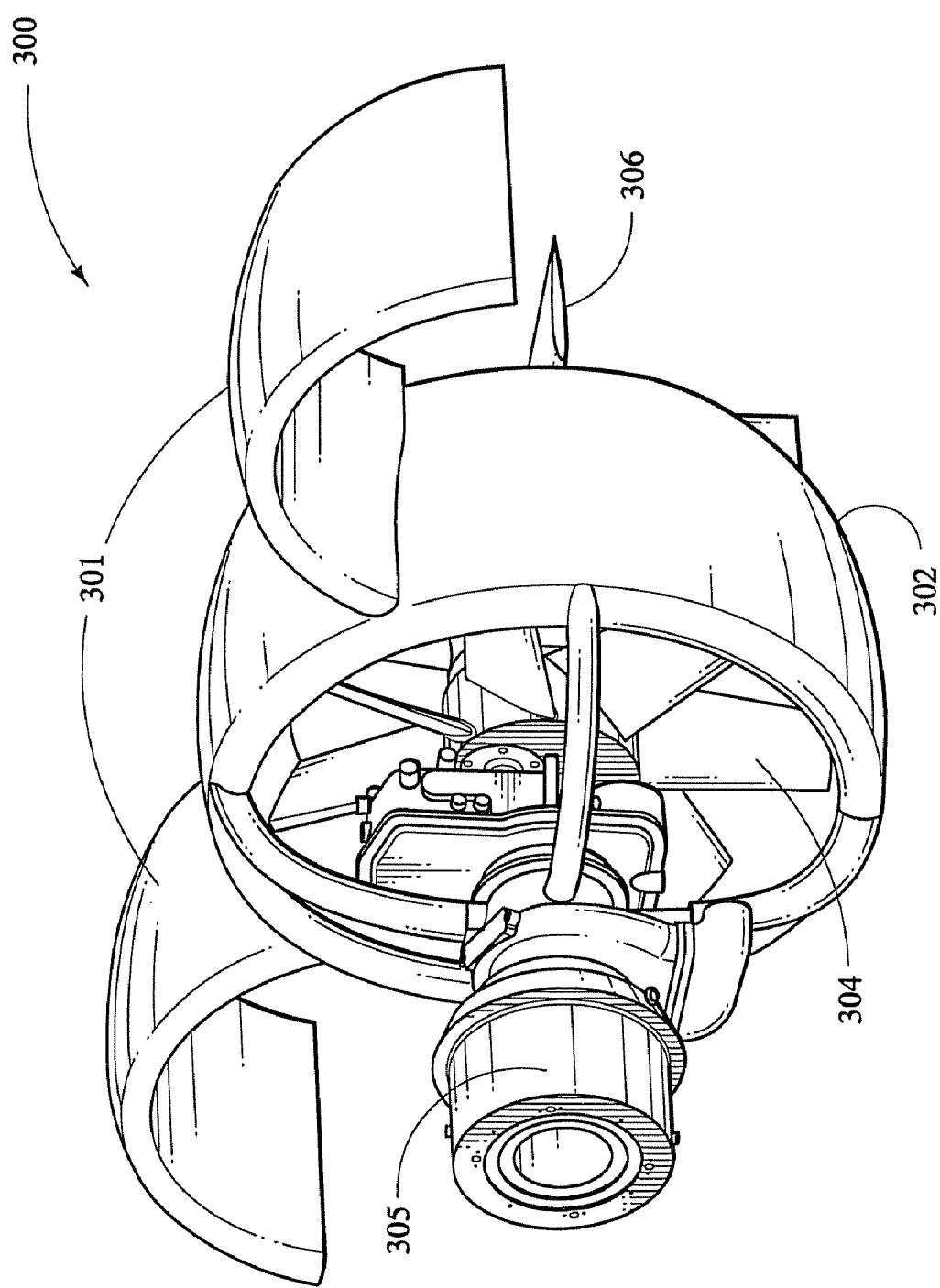
FIG. 3 shows a perspective view of the ducted fan air in forward flight operation.

FIG. 3 shows a perspective view of an example ducted fan air vehicle 300 in forward flight operation. The air vehicle 300 is shown in forward flight with the wings 301 fully deployed. As shown in FIG. 3, the air vehicle 300 is moving to the left.

The vehicle 300 includes a body section 302, an impeller 304 and a motor 305. The motor 305 drives the impeller 304 to generate a propulsive force. Typically, the motor is driven by electrical power or a gasoline-fueled engine, though any method of generating mechanical energy is appropriate. Control of the motor can be exercised by remote control, or through preprogrammed instructions. The propulsive force from the impelled air is directed by one or more vanes 306 to enable a variety of flight maneuvers. Control of the vanes 306 can also be exercised by remote control or through preprogrammed flight instructions.

The wings 301 follow the general radius and curvature of the body 302 of the vehicle 300. When deployed, the wings 301 provide lift while the vehicle is moving forward, reducing the proportion of the force from the impeller 304 directed towards creating lift, and enabling more force from the impeller 304 to be directed towards forward flight.

Figure 4:
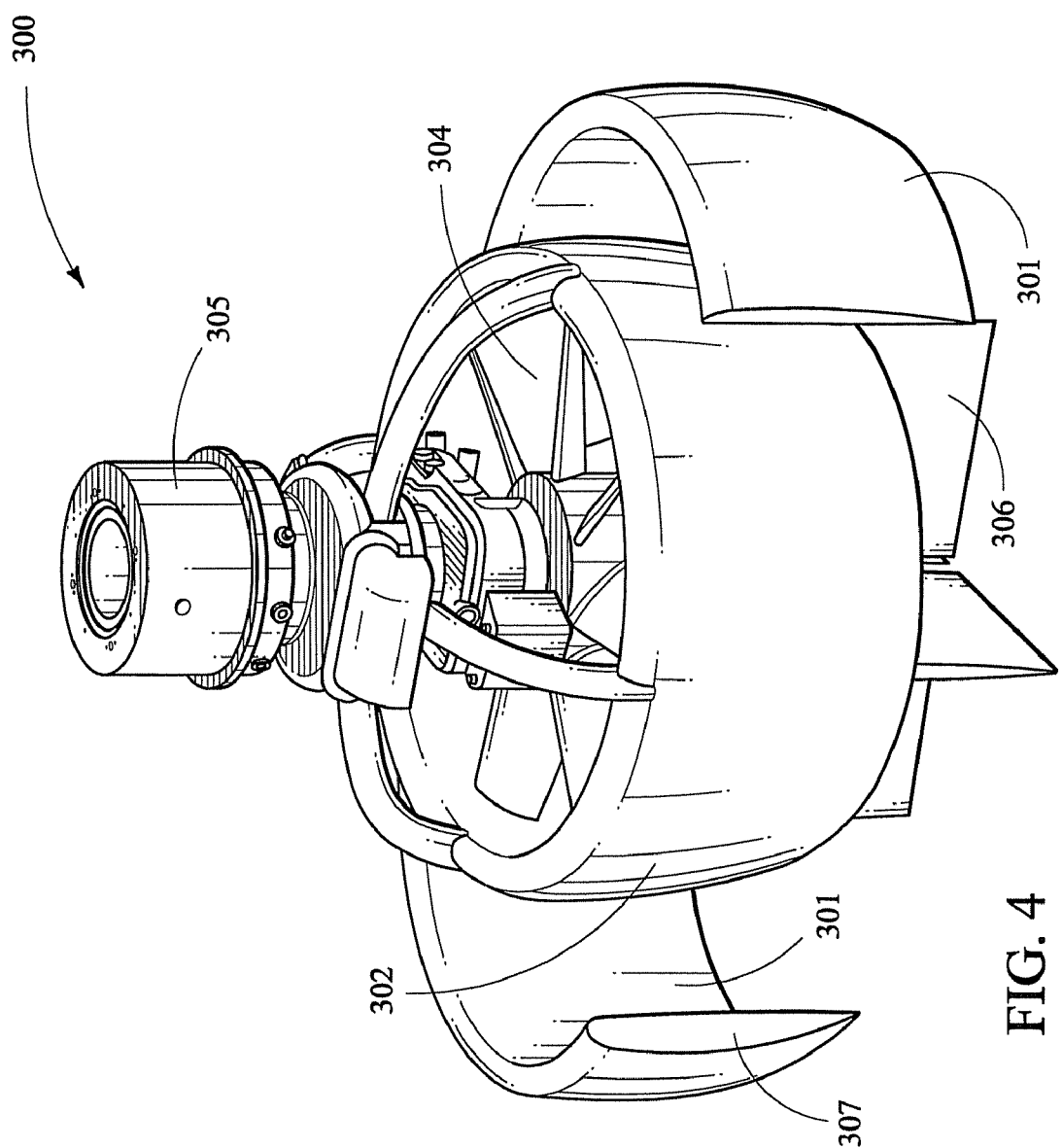
FIG. 4 shows a perspective view of the ducted fan air vehicle in a hover operation.

FIG. 4 shows a perspective view of the ducted fan air vehicle 300 in hover operation. The vehicle 300 is shown in hover with the wings 301 partially retracted.

The wings 301 possess a profile 307 such that when the wings 301 are fully deployed and the vehicle 300 is in forward flight, the wings 301 provide lift. The wing profile 307 is only one appropriate profile, and persons of ordinary skill in the art will recognize that any wing profile that provides the desired aerodynamic properties is appropriate. The wings 301 themselves possess a shape and a curvature that generally conforms to the shape of the body 302 of the vehicle 300. For example, as shown in FIG. 4, the wings 301 may be have a semi-circular shape.

However, the wing shape depicted in FIG. 4 represents only one embodiment, and alternate wing shapes that provide the desired aerodynamic profile when in a retracted position may also be implemented.

When hovering, the wings 301 will typically be in a retracted position, while the motor 305 drives the impeller 304 to lift the air vehicle 300 in a vertical fashion. The vanes 306 direct the impelled air to allow for a variety of flight maneuvers while hovering. The wings 301 are retracted during the hover operation to provide less resistance to the movement of the vehicle 300 and increase the stability of the hover.

FIGS. 5A-C show perspective views of the ducted fan air vehicle 300 in operation transitioning from the hover operation to the forward flight operation.

At a first time shown in FIG. 5A, the vehicle 300 is in a hover position, with the wings 301 stowed in a retracted position. The motor 305 drives the impeller 304 to generate a propulsive force. A plurality of vanes 306 directs the force downward, creating lift and allowing the vehicle 300 to hover.

At a second time shown in FIG. 5B, the wings 301 are in the process of deploying. During deployment of the wings 301, the vehicle 300 tips forward such that the propulsive force generated by the motor 305 and the impeller 304 provides lift for the vehicle 300 in conjunction with the lift provided by the wings 301. Deployment of the wings 301 is initiated by servo motors and is further aided by the air pressure experienced by the wings 301 during deployment.

At a third time shown in FIG. 5C, the wings 301 are fully deployed, and the vehicle 300 is in forward flight (e.g., moving to the right as shown in FIG. 5C). In this configuration, the wings 301 provide lift for the vehicle 300, and the propulsive force generated by the motor 305 and impeller 304 primarily provides forward thrust. The direction of the vehicle 300 is controlled primarily by a plurality of vanes 306, which can change orientation to provide the desired change in direction of the vehicle 300.

Figure 6C:
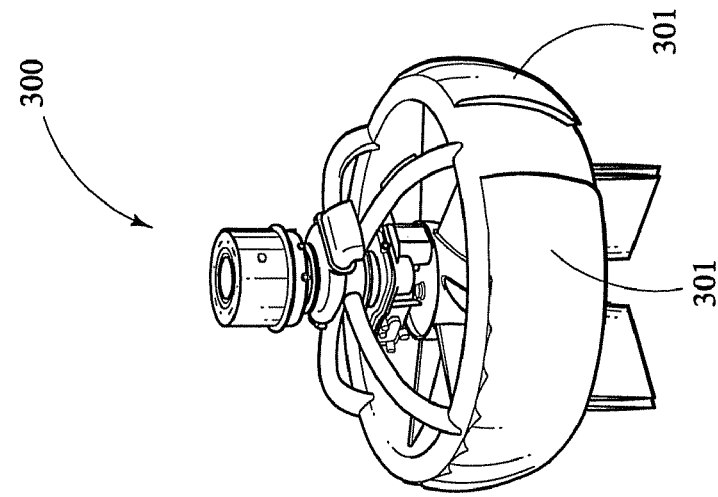
FIG. 6 shows a sequence of perspective views of the ducted fan air vehicle transitioning from the forward flight operation to the hover operation.
Figure 6B:
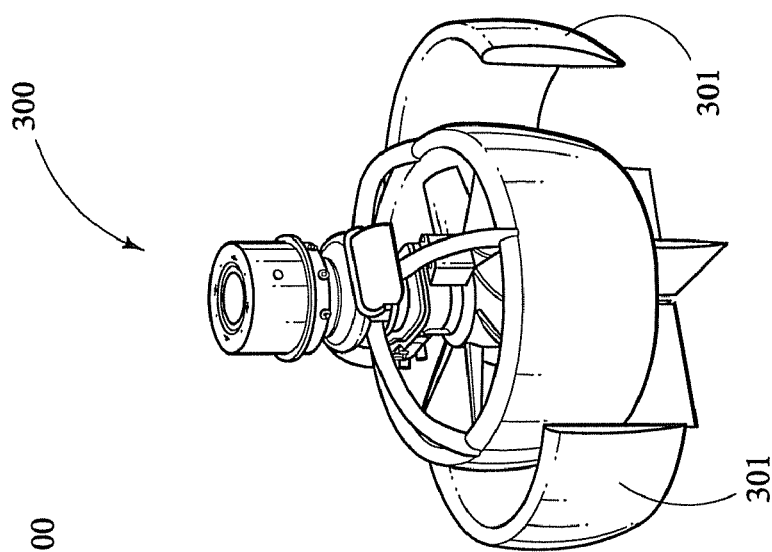
Figure 6A:
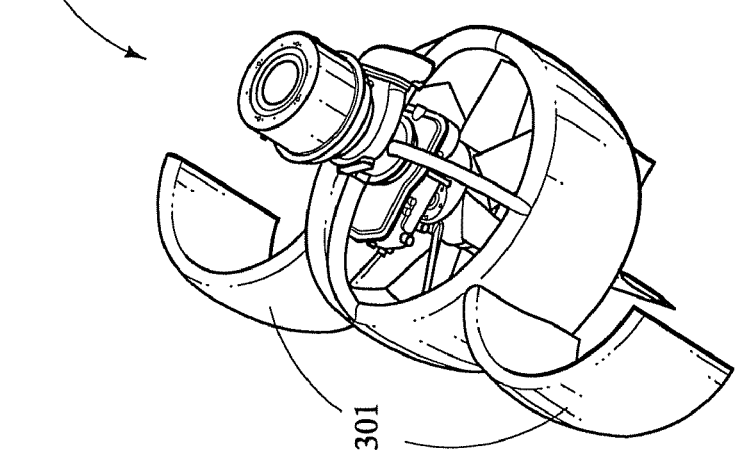

FIG. 6 shows a perspective view of the ducted fan air vehicle 300 in operation transitioning from forward flight operation to the hover operation At a first time as shown in FIG. 6A, the vehicle 300 is beginning the transition from forward flight to hover. The wings 301 are in a fully deployed position, and the body of the vehicle 300 is beginning to move into an upright position. In this configuration, the deployed wings 301 provide air braking to assist the vehicle 300 in transitioning from forward flight to hover.

At a second time as shown in FIG. 6B, the vehicle 300 is in a hover and has commenced moving the wings 301 into a retracted position. In this configuration, there is little or no air load on the wings 301 and servo motors can be used to move the wings 301 into a retracted position.

At a third time shown in FIG. 6C, the wings 301 are stowed in a retracted position, and the vehicle 300 is in a hover.

In general, the wings 301 will typically be stowed while the air vehicle 300 is in a hover, in order to improve stability characteristics (e.g. with regard to winds). The wings 301 will generally be deployed during forward flight (e.g. other than hover flight), in order to improve aerodynamic lift and efficiency. The wings 301 and other aspects of the design may be optimized for a particular speed of travel.

Deployment and retraction of the wings 301 can be implemented automatically based on the airspeed of the vehicle 300. The wings 301 could automatically be deployed based on exceeding a given speed threshold based on where the wings 301 become effective. Retraction could occur when the vehicle 300 has slowed to where the wings 301 are no longer effective and where minimal retraction force would be required. These speeds could be determined empirically, for example.

Design details for a retractable wing will depend on the characteristics of the air vehicle itself (e.g. size, shape, propulsive capabilities of the motor). For example, the wings could be constructed using two layers glass with a carbon stiffener, and formed in a shape that approximates a profile of the air vehicle itself. However, persons of ordinary skill in the art will recognize that the wings can be constructed from a wide variety of materials and formed in any shape that provides the desired aerodynamic properties.

In some situations, such as when operation of the air vehicle includes minimal non-hover flight, increased forward-flight efficiency provided by wings may not overcome the loss in efficiency due to the additional weight of the wings. In an example implementation, the associated additional weight is avoided by using the deployable wing only when the operation of the air vehicle includes distance requirements. In such a case, the wing would be used as a temporary attachment to the vehicle, as called for by a desired operation.

While the wings illustrated in FIGS. 1-6 are generally round in shape, with a radius of curvature similar to that of the body of the air vehicle, this is an example implementation only. Other implementations, such as those utilizing a wing that straightens upon deployment, could alternatively be utilized.

The applications to which present embodiments may apply are not limited to the examples described above. While example applications for the air vehicles include operations in which the air vehicle glides or flies to its target location, the present application may provide benefits to other uses as well. Using the present embodiments, aerodynamic lift, and thus efficiency can be improved without significantly affecting hover stability in a wind.

While examples have been described in conjunction with present embodiments of the application, persons of skill in the art will appreciate that variations may be made without departure from the scope and spirit of the application. The true scope and spirit of the application is defined by the appended claims, which may be interpreted in light of the foregoing.

What is claimed:

1. A ducted fan air vehicle comprising:
a body including a motor and impeller controlled by the motor;
a first retractable wing having a first end and a second end, wherein the first end is connected to the body, and wherein in a retracted position the first retractable wing conforms with a profile of the ducted fan air vehicle and in a deployed position the second end is extended outward from the body, wherein the first retractable wing includes a first section and a second section connected to each other via a hinge; and
a second retractable wing connected to the body, wherein the first retractable wing and the second retractable wing overlap while in a retracted position.

2. The ducted fan air vehicle of claim 1, wherein the first retractable wing is:
deployed in the deployed position for a forward-flight operation of the ducted fan air vehicle; and
stowed in the retracted position for a hover-flight operation of the ducted fan air vehicle.

3. The ducted fan air vehicle of claim 1, wherein the first retractable wing is detachable from the ducted fan air vehicle.

4. The ducted fan air vehicle of claim 1, wherein the first end of the first retractable wing is connected to the body via a hinge.

5. The ducted fan air vehicle of claim 1, wherein in the retracted position the first section and the second section conform with the profile of the ducted fan air vehicle.

6. A ducted fan air vehicle comprising:
a body including a motor and impeller controlled by the motor; and
at least one retractable wing having a first end and a second end, wherein the first end is connected to the body, and wherein in a retracted position the retractable wing conforms with a profile of the ducted fan air vehicle and in a deployed position the second end is extended outward from the body, and wherein the retractable wing:
is deployed automatically when the ducted fan air vehicle meets or exceeds a pre-selected speed; and
is retracted automatically when the ducted fan air vehicle slows to or below a pre-selected speed.

7. The ducted fan air vehicle of claim 6, wherein in the retracted position the retractable wing is positioned adjacent a portion of a perimeter of the body.

8. The ducted fan air vehicle of claim 6, wherein the first end of the retractable wing is connected to the body via a hinge and wherein in the deployed position the retractable wing is rotated by the hinge so that the second end extends outward from the body.

9. The ducted fan air vehicle of claim 8, further comprising a second motor connected to the hinge to control operation of the retractable wing.

10. The ducted fan air vehicle of claim 6, wherein the retractable wing is detachable from the ducted fan air vehicle.

11. The ducted fan air vehicle of claim 6, wherein the first end of the retractable wing is connected to the body via a hinge.

12. The ducted fan air vehicle of claim 6, wherein the retractable wing includes a first section and a second section connected to each other via a hinge.

13. The ducted fan air vehicle of claim 12, wherein in the retracted position the first section and the second section conform with the profile of the ducted fan air vehicle.

14. The ducted fan air vehicle of claim 12, wherein the retractable wing and a second retractable wing overlap while in a retracted position.

* * * * *